United States Patent
Chyi et al.

(10) Patent No.: US 8,459,096 B2
(45) Date of Patent: Jun. 11, 2013

(54) RADON MONITORING SYSTEM FOR EARTHQUAKE PREDICTION

(75) Inventors: Lindgren Lin Chyi, Fairlawn, OH (US);
Thomas J. Quick, Peninsula, OH (US);
Tsanyao Frank Yang, Zhonghe (TW);
Cheng-Hong Chen, Taipei (TW);
Kuo-Wei Wu, Kaohsiung (TW)

(73) Assignee: The University of Akron, Akron, OH (US)

( * ) Notice: Subject to any disclaimer, the term of this patent is extended or adjusted under 35 U.S.C. 154(b) by 908 days.

(21) Appl. No.: 11/815,047

(22) PCT Filed: Jan. 31, 2006

(86) PCT No.: PCT/US2006/003300
§ 371 (c)(1),
(2), (4) Date: Apr. 2, 2010

(87) PCT Pub. No.: WO2006/083802
PCT Pub. Date: Aug. 10, 2006

(65) Prior Publication Data
US 2010/0187411 A1  Jul. 29, 2010

Related U.S. Application Data

(60) Provisional application No. 60/648,533, filed on Jan. 31, 2005.

(51) Int. Cl.
*G01N 7/00* (2006.01)
(52) U.S. Cl.
USPC .......................................... 73/19.01
(58) Field of Classification Search
USPC .................................. 73/19.01; 250/253
See application file for complete search history.

(56) References Cited

U.S. PATENT DOCUMENTS

| RE33,065 E * | 9/1989 | Alter et al. ............ 250/253 |
| 5,003,176 A * | 3/1991 | Tanaka et al. .......... 250/374 |
| 5,408,862 A | 4/1995 | Elkins |
| 5,438,324 A | 8/1995 | Chyi et al. |
| 5,625,138 A | 4/1997 | Elkins |
| 6,288,400 B1 * | 9/2001 | Negro .................. 250/380 |

FOREIGN PATENT DOCUMENTS

| JP | 62102134 | 5/1987 |
| JP | 8075859 | 3/1996 |
| JP | 11295435 | 10/1999 |

OTHER PUBLICATIONS

Machine English Translation of Tasaka et al., Japanese Patent No. JP 8075859 A, dated Mar. 22, 1996, translated Jun. 2012.*
H. Ward Alter, Robert L. Fleischer, Passive Integrating Radon Monitor for Environmental Monitoring, Article, Health Physics, vol. 40 (May), pp. 693-702—1981, U.S.A.
Chyi, L.L. et al, Continuous Radon Measurements in Faults and Earthquake Precursor Pattern Recognition, Wester Pacific Earth Sciences, May 2001, vol. 1, No. 2, pp. 227-246.
Chyi, L.L. et al, Automated Radon Monitoring of Seismicity in a Fault Zone, Geofisica Internacional 2002, vol. 41, No. 4, pp. 507-511.

* cited by examiner

*Primary Examiner* — Hezron E Williams
*Assistant Examiner* — David Z Huang
(74) *Attorney, Agent, or Firm* — Renner Kenner Greive Bobak Taylor & Weber

(57) ABSTRACT

The present invention is related to a system for monitoring radon emissions to predict earthquakes. In one embodiment, the present invention relates to a radon monitoring system that is designed to remotely monitor the release of radon gas and to use such data in the prediction of earthquakes.

10 Claims, 19 Drawing Sheets

RADON MONITORING SYSTEM FOR EARTHQUAKE PREDICTION

FIELD OF THE INVENTION

The present invention is related to a system for monitoring radon emissions to predict earthquakes. In one embodiment, the present invention relates to a radon monitoring system that is designed to remotely monitor the release of radon gas and to use such data in the prediction of earthquakes.

BACKGROUND OF THE INVENTION

The immediate cause of earthquake is believed to be the result of elastic rebound. The explanation has been confirmed over the years. If the rock formations are low in modulus of elasticity, then the maximum deformation is realized before rebound rather than after. During initial energy accumulation stage, there is no change in soil gas radon level. However, radon level starts to increase when stress exceeded one half of the rock strength. Small spike like anomalies start to appear as a result of micro puncture of rock formation and the formation of micro seep when groundwater level is increasing at the same time. The volume of rock starts to increase responding to the development of microfracturing and the flow of groundwater into these fractures. As the microfractures are interconnected, added amount of groundwater will flow into these spaces and result in lowering of groundwater level. The drastic lowering of groundwater level in conjunction with the maximum deformation before rebound produces spike like radon anomaly of short duration. Further interconnecting of the fractures will result in sliding along fault and the rebound. For a stack of mudstone dominant sedimentary rocks, the rebound is small compare with the maximum deformation. After this fast radon release, radon flux starts to decrease while groundwater level is gradually rising responding to the continuing increase of stress after all the fracture spaces are filled. Sometime at this point, the slide along fault occurs and it is the onset of earthquake. The radon release pattern before the onset of an earthquake implies that there must be a degas phase because radon with a molecular weight of 222 is the heaviest natural occurring gas.

Radon anomalies, either in groundwater or as soil gas, have been used as earthquake precursors. However, in actual prediction of earthquakes the precursor is not always effective. One problem is that the signal to background ratio must be improved by placing the detector within a fracture zone of an active fault with upwelling gases. Secondly, the environmental factors affecting radon variation must be reduced, by housing of the detector. Thirdly, the data recording must be continuous and retrievable at a remote site. Thus, there is a need in the art for an improved radon detector that can be used in conjunction with the prediction of earthquakes. There is also a need in the art for a remote radon sensing device that can be used in conjunction with earthquake prediction.

The following patents and publications are part of the background of the invention and are incorporated herein by reference:
(1) Chyi, L. L., Chou, C. Y., Yang, F. T., and Chen, C. H., 2001, *Continuous radon measurements in faults and earthquake precursor pattern recognition*, Western Pacific Sciences, v. 1, no. 2, 227-245;
(2) Chyi, L. L., Chou, C. Y., Yang, F. T., and Chen, C. H., 2002, *Automated radon monitoring of seismicity in a fault zone*, Geofisica International, v. 41, no. 4, 507-511;
(3) U.S. Pat. Nos. 5,408,862 and 5,625,138 to Elkins; and
(4) U.S. Pat. No. 5,438,324 to Chyi.

SUMMARY OF THE INVENTION

The present invention is related to a system for monitoring radon emissions to predict earthquakes. In one embodiment, the present invention relates to a radon monitoring system that is designed to remotely monitor the release of radon gas and to use such data in the prediction of earthquakes.

In one embodiment, the present invention relates to a device for detecting radon gas comprising: at least one radon sensing means operatively coupled to at least one radon detecting means; a power means operative coupled to both the at least one radon sensing means and the at least one radon detecting means; and at least one entry means designed to permit the inflow of radon gas while restricting the flow of moisture and other detrimental environmental factors, wherein the at least one radon sensing means, the at least one radon detecting means and the power means are enclosed in a water-proof container.

In another embodiment, the present invention relates to a method for detecting radon gas in order to predict earthquakes, the method comprising the steps of: (A) placing a radon monitoring device in the ground at a suitable monitoring location, the radon monitoring device comprising: at least one radon sensing means operatively coupled to at least one radon detecting means; a power means operative coupled to both the at least one radon sensing means and the at least one radon detecting means; and at least one entry means designed to permit the inflow of radon gas while restricting the flow of moisture and other detrimental environmental factors, wherein the at least one radon sensing means, the at least one radon detecting means and the power means are enclosed in a water-proof container; (B) using the radon monitoring device to detect changes, over time, in the amount of radon gas escaping from the ground; (C) using the detected changes in the amount of radon gas released, over time, from the ground to generate radon gas release data; (D) collecting the radon gas data from Step (C) for analysis in order to predict the occurrence of at least one earthquake.

DETAILED DESCRIPTION OF THE INVENTION

Figure 1:
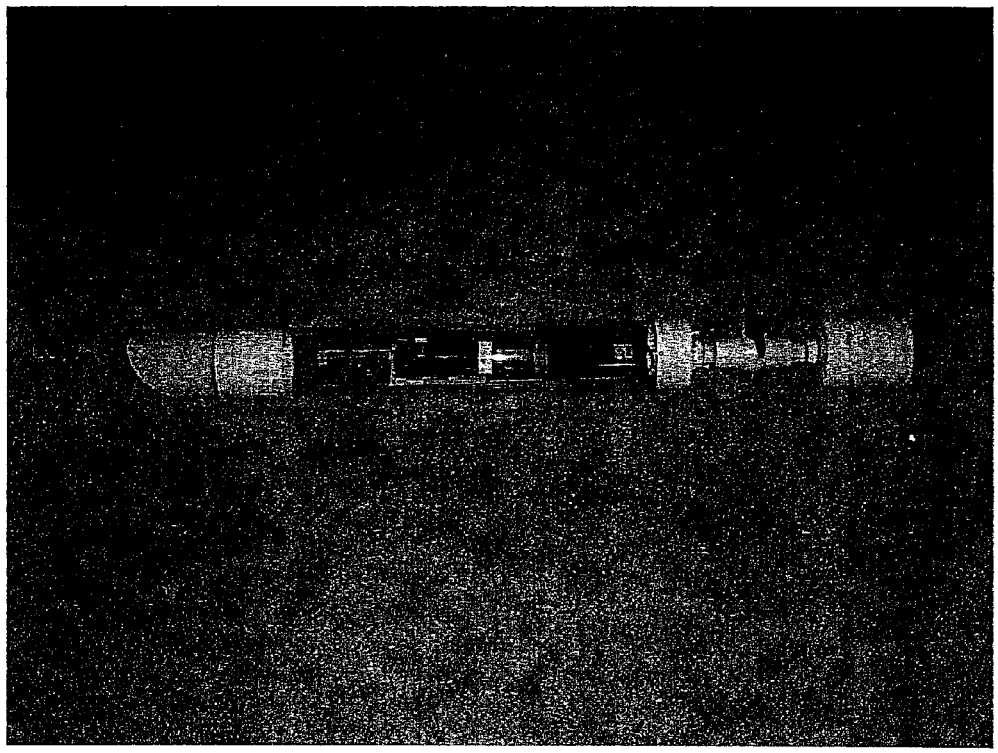
FIG. 1 is a photograph showing a radon monitoring device according to one embodiment of the present invention.
Figure 2:
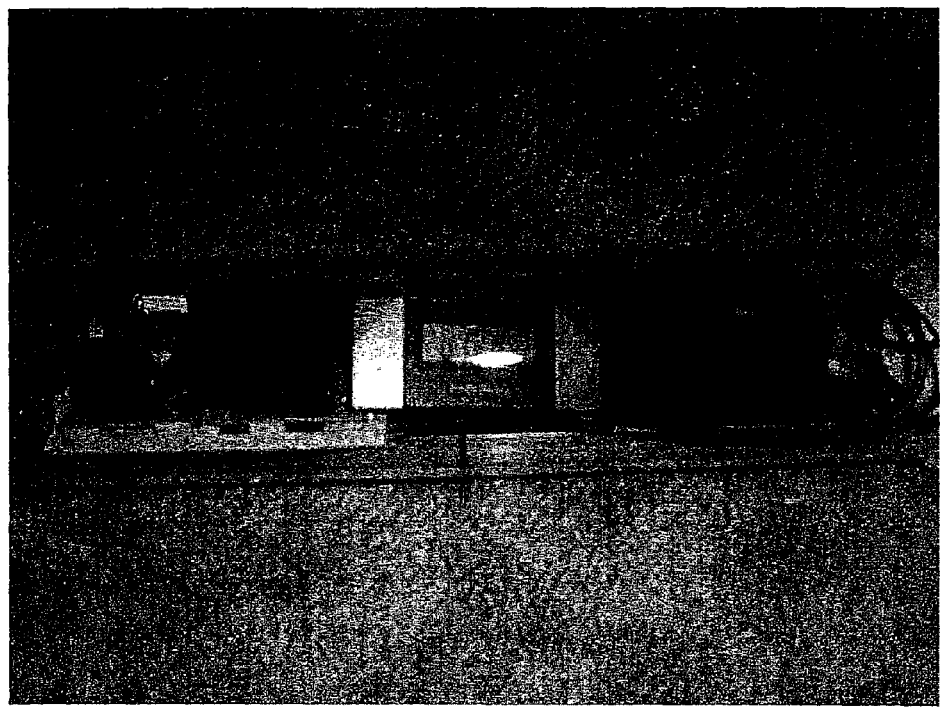
FIG. 2 is a close-up photograph showing the temperature and humidity display portion of a radon monitoring device according to one embodiment of the present invention.
Figure 3:
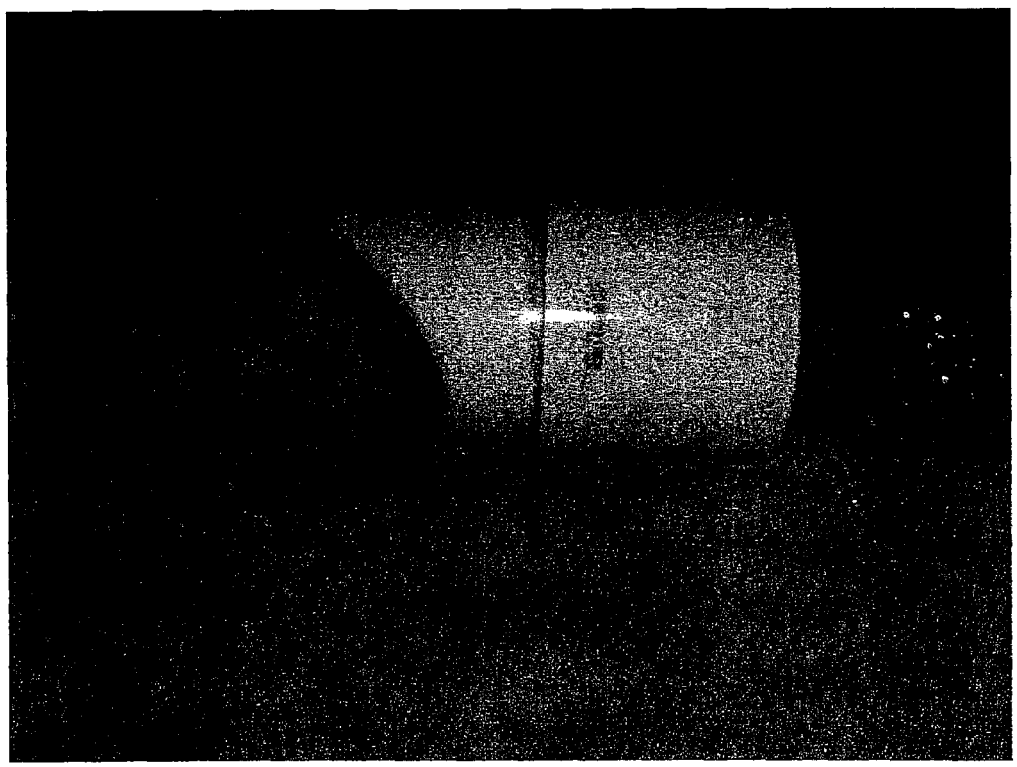
FIG. 3 is a close-up photograph showing the lower radon gas entry port having a angled end in accordance with one embodiment of the present invention.
Figure 4:
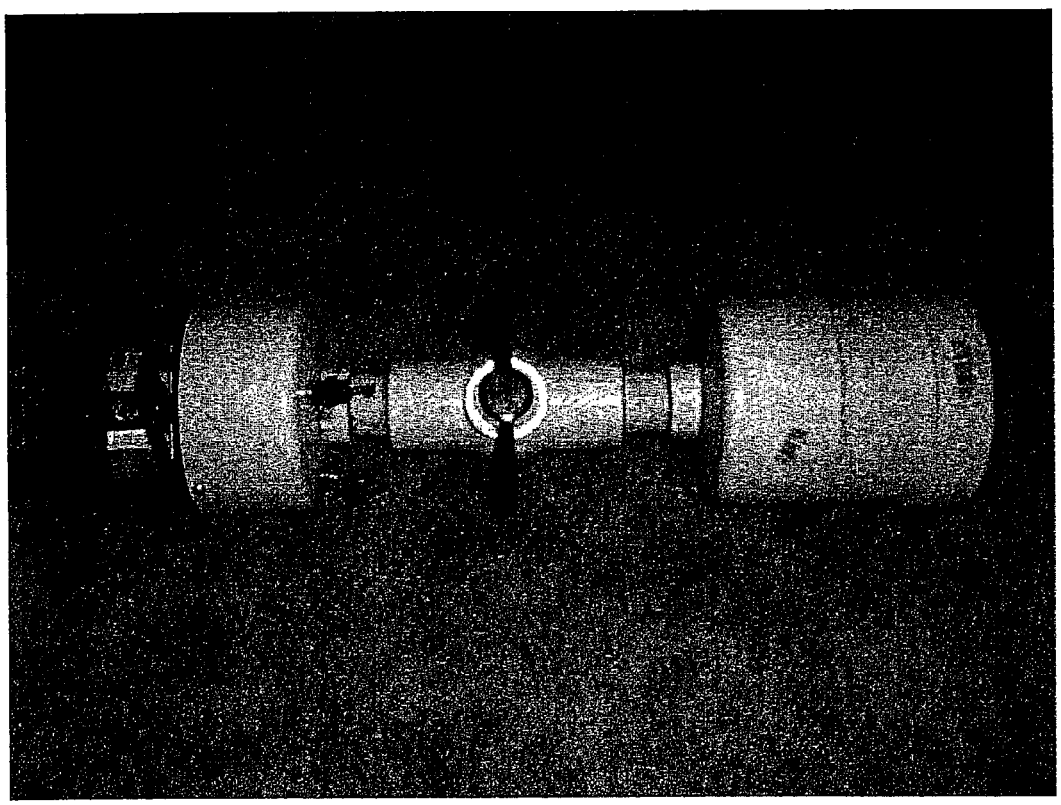
FIG. 4 is a close-up photograph of the upper portion of the radon monitoring device of FIG. 1 and in particular the valve and desiccant chamber.
Figure 5:
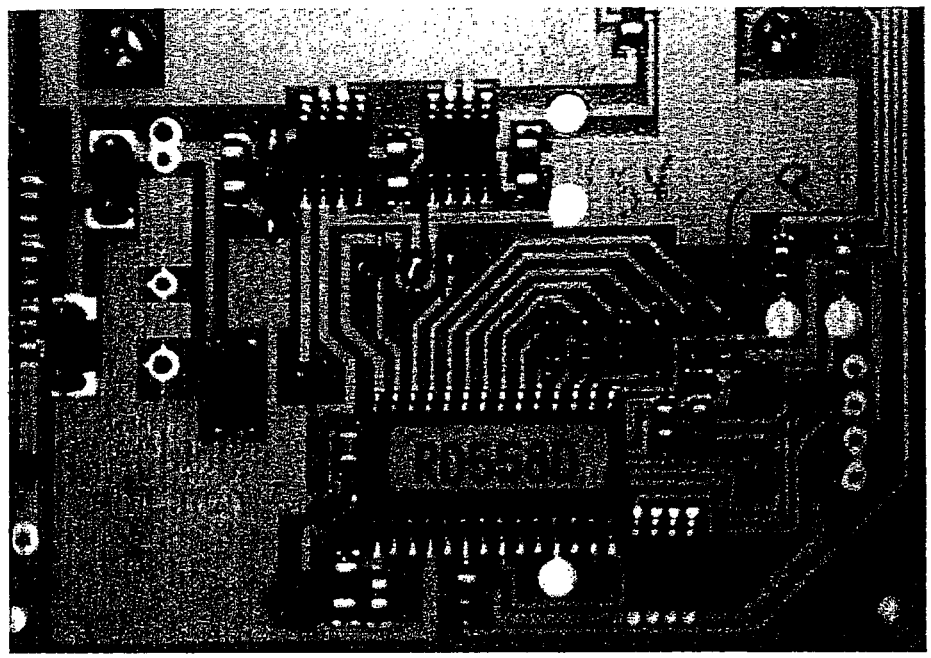
FIG. 5 is a lose-up photograph of a circuit board used in a radon monitoring device according to one embodiment of the present invention, the circuit board being designed to control a safety siren.
Figure 6:
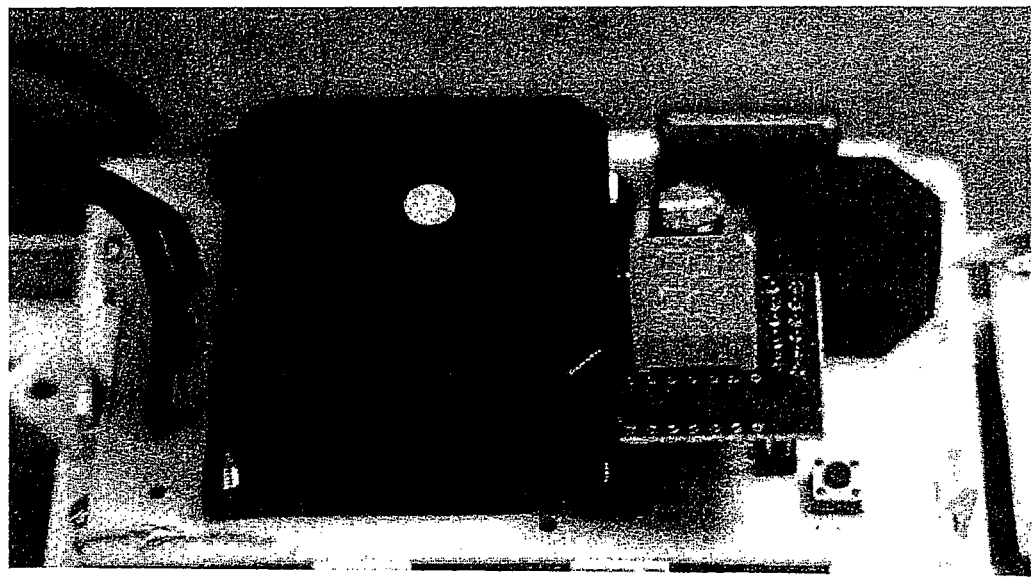
FIG. 6 is a close-up photograph of a solid state detector utilized in one embodiment of the present invention, the solid state detector including an octagonal buzzer.
Figure 7:
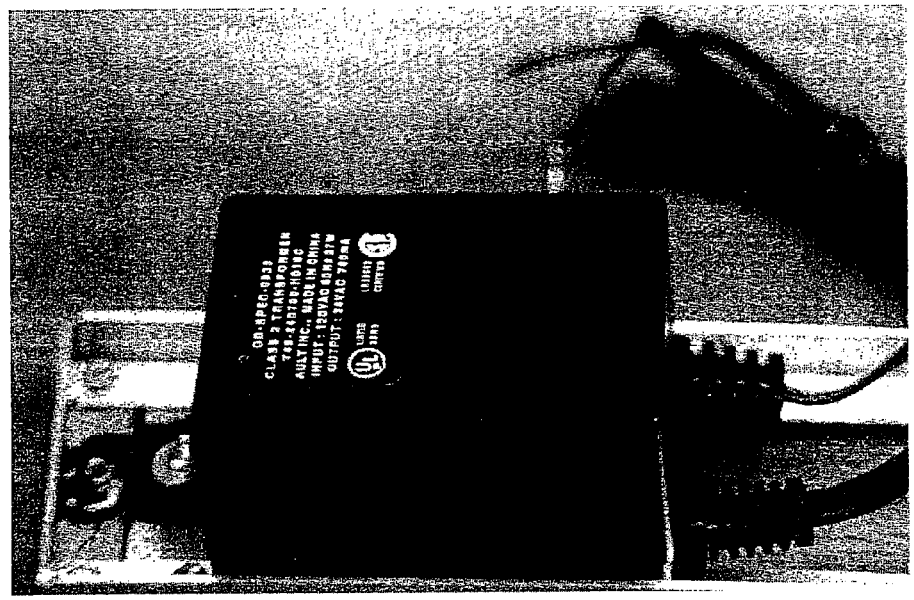
FIG. 7 is a close-up photograph of a voltage conversion and heat generating system utilized in a radon monitoring device in accordance with one embodiment of the present invention, the voltage conversion and heat generating system being designed to supply the necessary current to the safety siren and supply heat to a radon monitoring device in accordance with the present invention.
Figure 8:
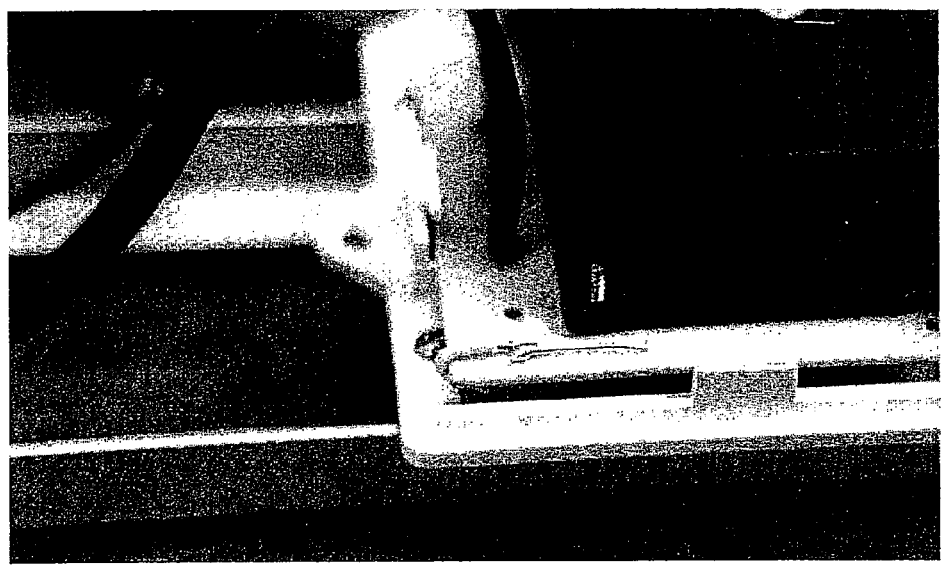
FIG. 8 is a close-up photograph of a ground connection contained in a radon monitoring device in accordance with the present invention, the ground connection being designed to protect against false counts by a radon monitoring device in accordance with the present invention.
Figure 9:
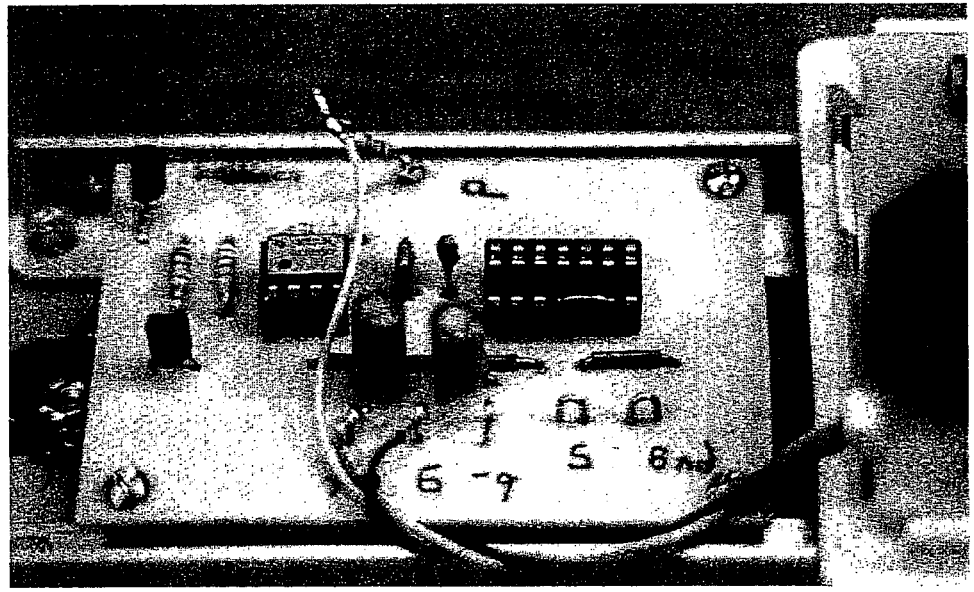
FIG. 9 is a close-up photograph of a computer interface circuit utilized in a radon monitoring device in accordance with one embodiment of the present invention.
Figure 10:
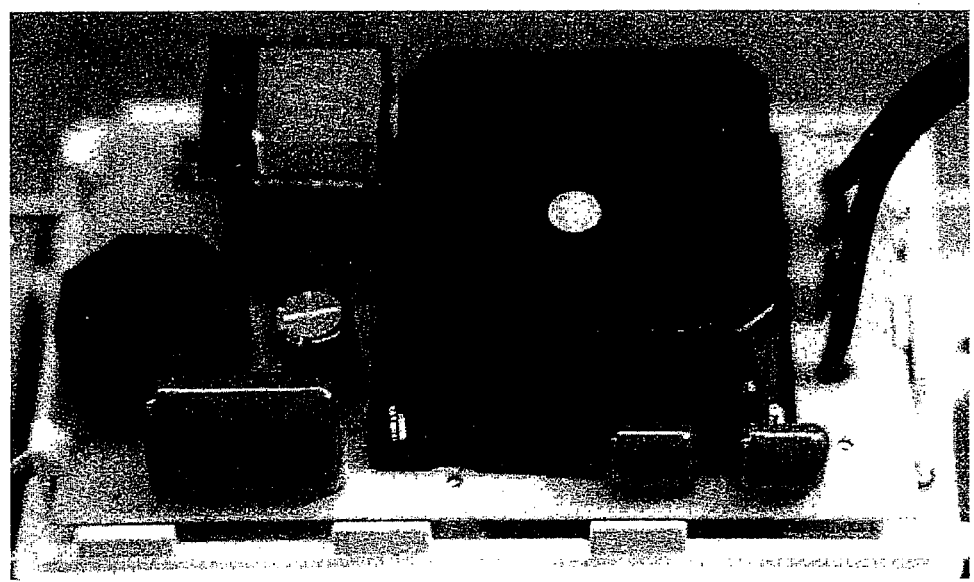
FIG. 10 is another close-up photograph of the solid state detector of FIG. 6 including a view of the detector, buzzer, high voltage capacitors and display unit.
Figure 11:
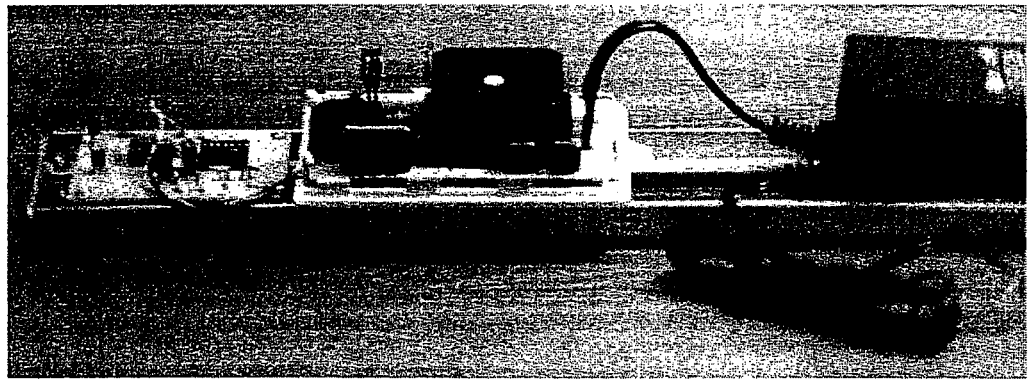
FIG. 11 is a close-up photograph of a transformer, detector and interface circuit sub-components of a radon monitoring device in accordance with one embodiment of the present invention, the sub-components being shown mounted on a chassis.
Figure 12:
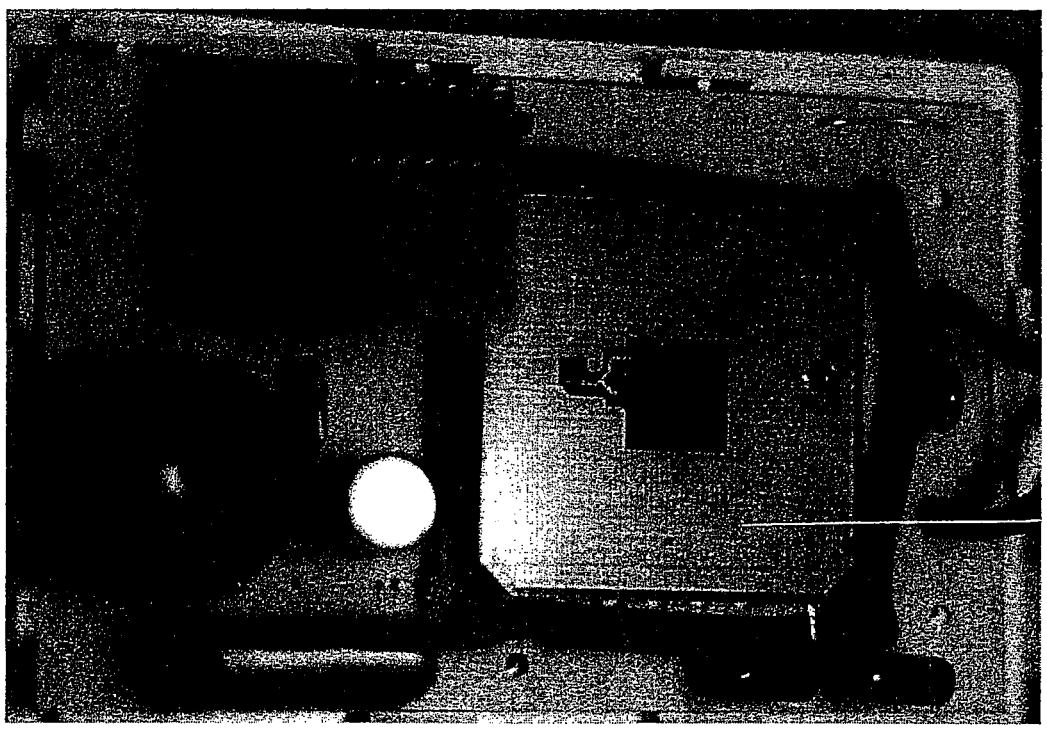
FIG. 12 is a close-up photograph of a solid state detector and microprocessor, where the solid state detector and microprocessor are designed to blink in order to confirm the proper functionality thereof in a radon monitoring device in accordance with one embodiment of the present invention.
Figure 13:
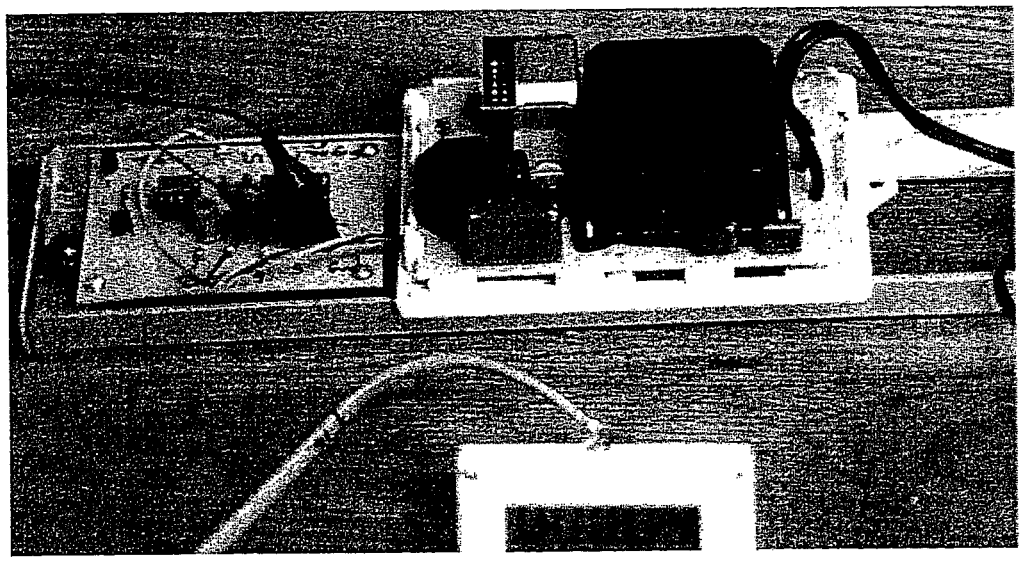
FIG. 13 is a close-up photograph showing a test of the interface circuit of FIG. 11.
Figure 14:
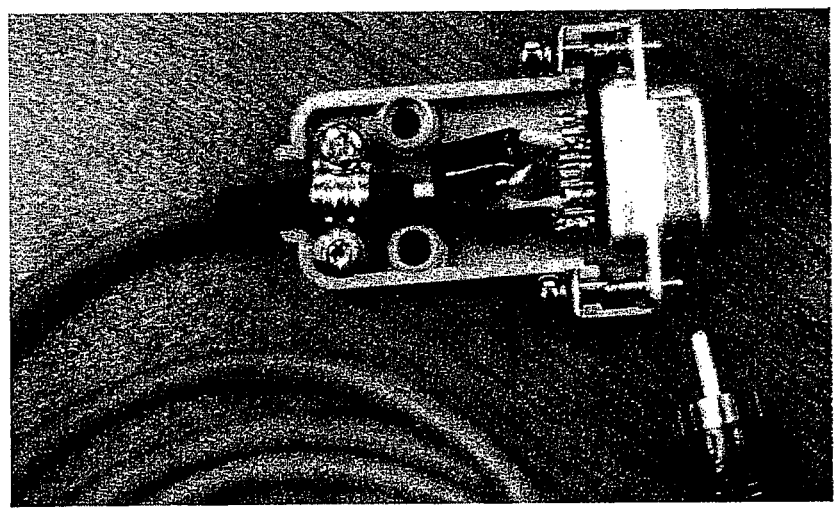
FIG. 14 is a close-up photograph showing a DB 9 connector to a computer RS232 port, with an RCA connector that is designed to be connected to a radon monitoring device according to the present invention.
Figure 15:
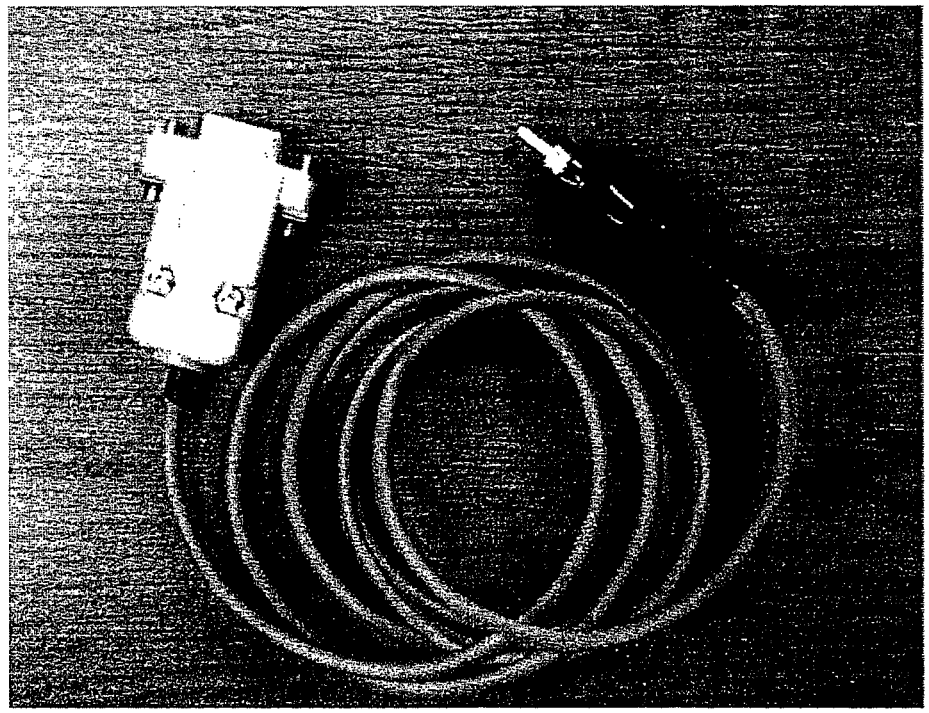
FIG. 15 is a second close-up photograph of a connector cable utilized in a radon monitoring device according to one embodiment of the present invention.
Figure 16:
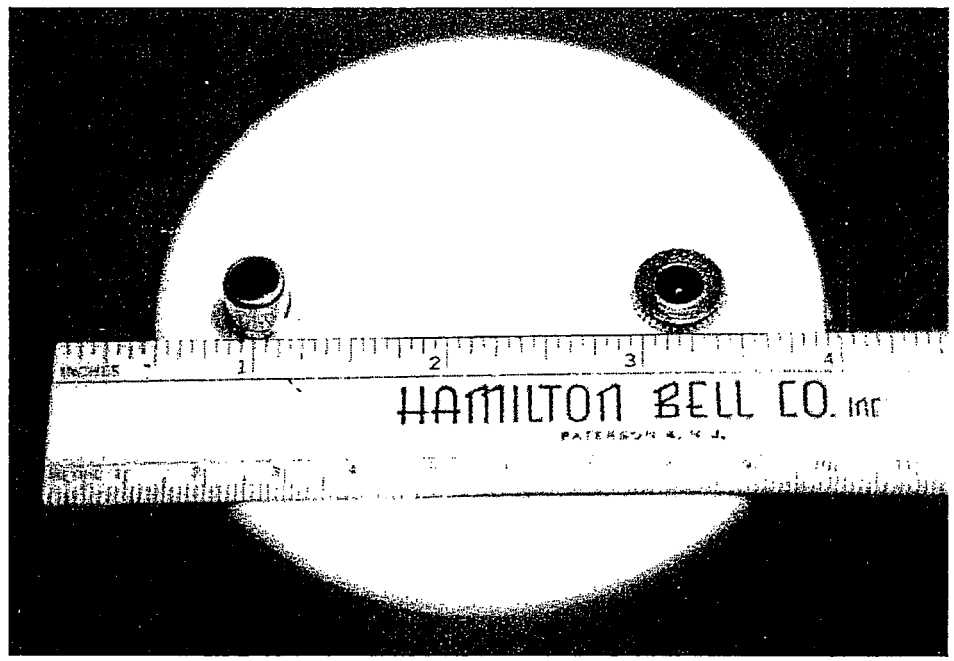
FIG. 16 is a close-up photograph showing the top portion of a radon monitoring device according to one embodiment of the present invention, the top portion thereof having, from left to right in FIG. 16, a data port and a 24 AC power port.
Figure 17:
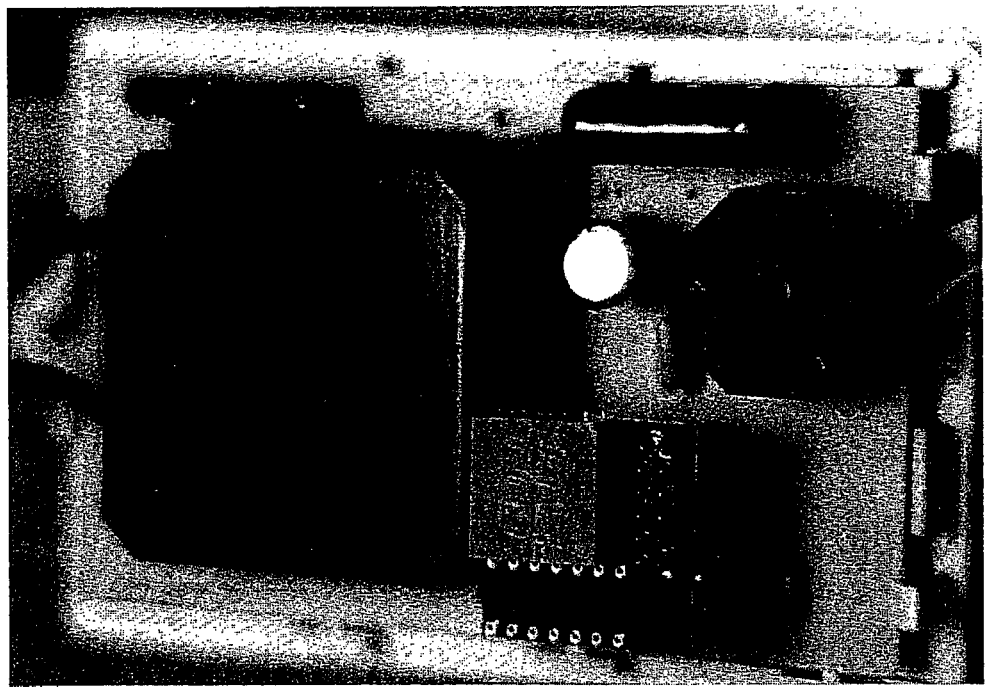
FIG. 17 is another close-up photograph of the solid state detector of FIGS. 6 and 10 including a view of the detector, buzzer, high voltage capacitors and display unit.
Figure 18:
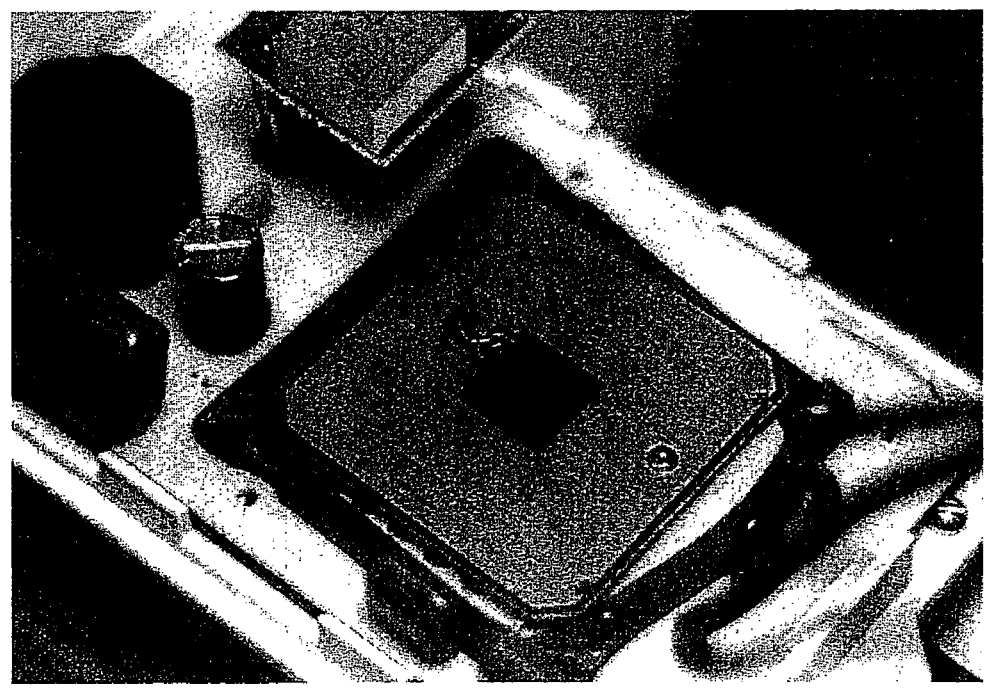
FIG. 18 is another close-up photograph of the solid state detector of FIG. 12.
Figure 19:
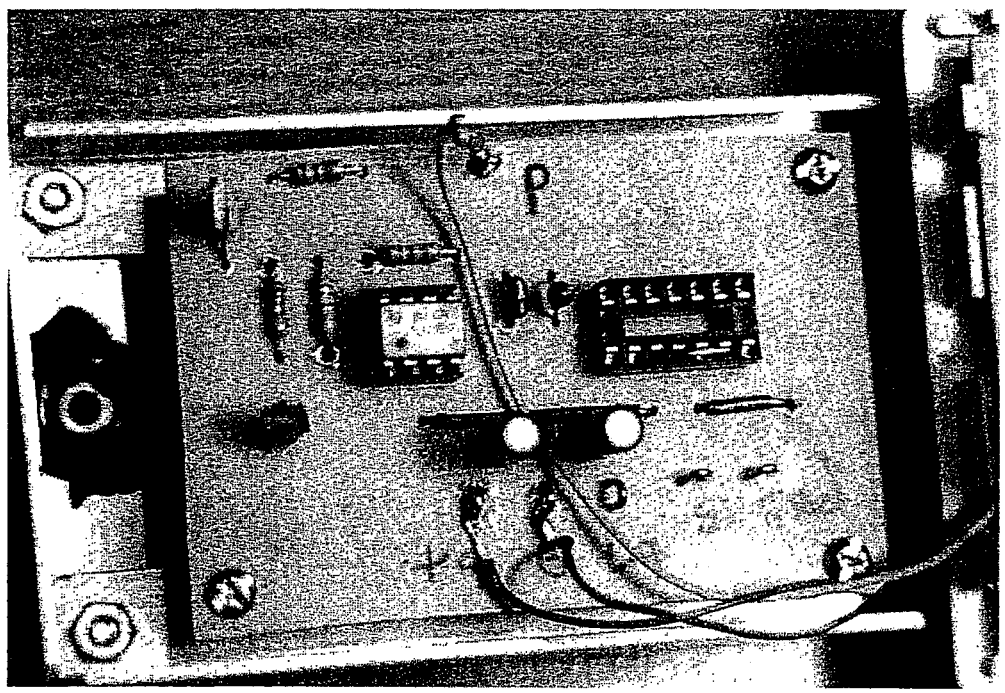
FIG. 19 is a another close-up photograph of the computer interface circuit of FIG. 9.
Figure 20:
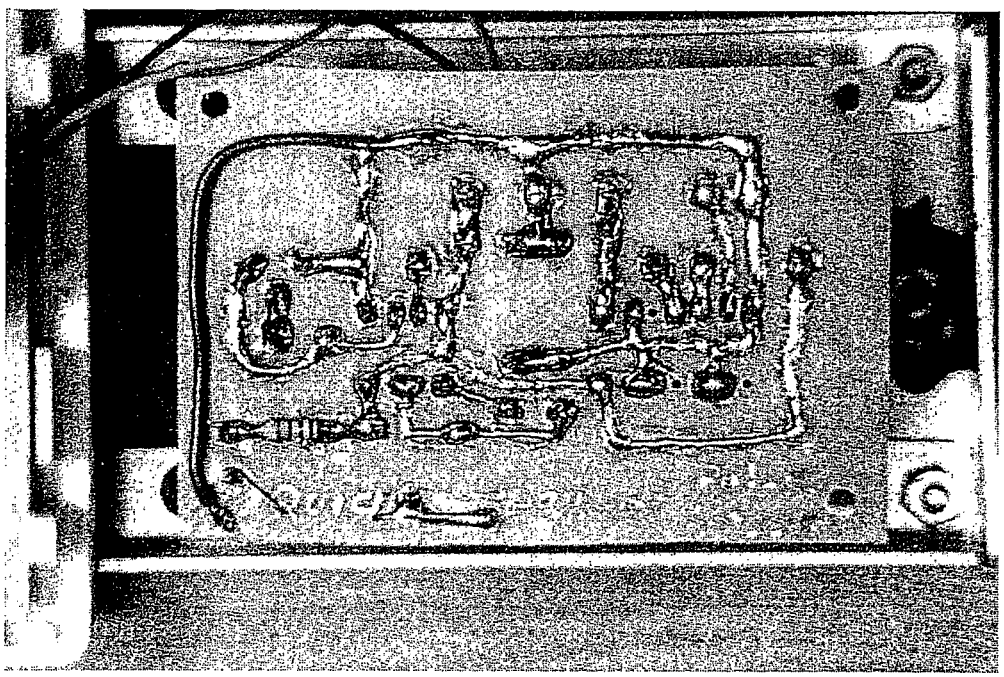
FIG. 20 is a close-up photograph of the backside of the computer interface circuit of FIGS. 9 and 19.
Figure 21:
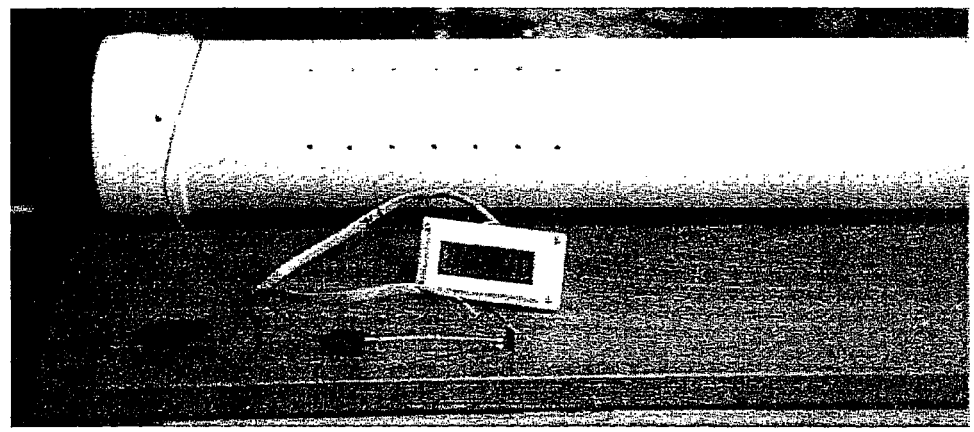
FIG. 21 is a close-up photograph of a radon monitoring device in accordance with one embodiment of the present invention with the radon monitoring device being enclosed in a container suitable for placing the radon monitoring device in the ground.
Figure 22:
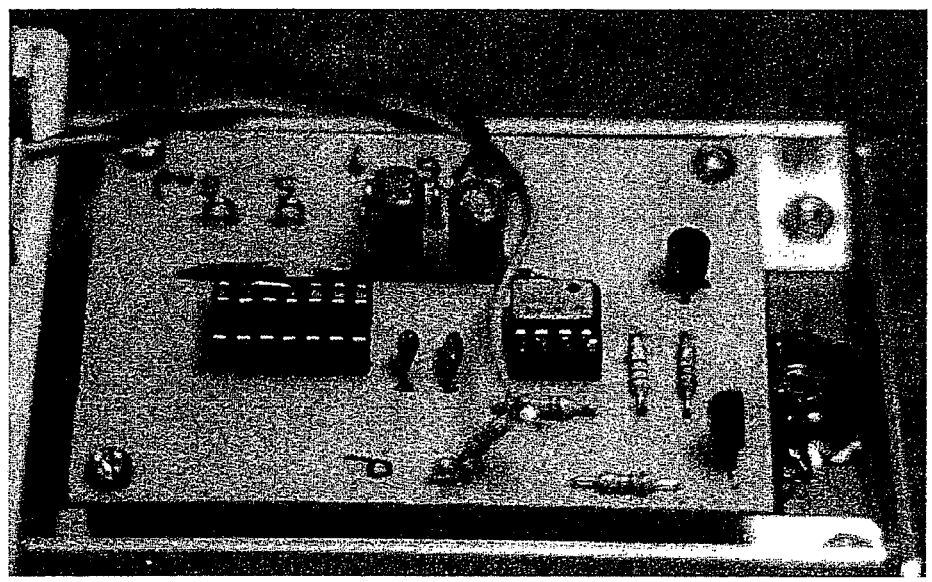
FIG. 22 is another close-up photograph of the computer interface circuit of FIGS. 9 and 19.
Figure 23:
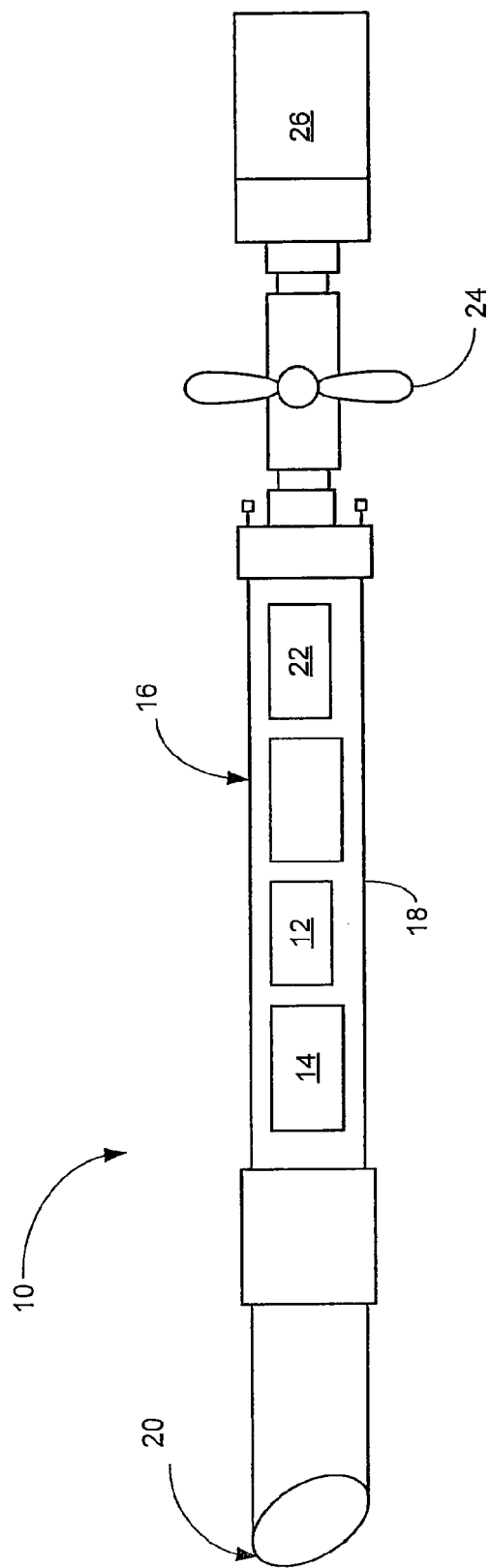
FIG. 23 is a side view of a radon monitoring device in accordance with one embodiment of the present invention based on the photograph of FIG. 1.
Figure 24:
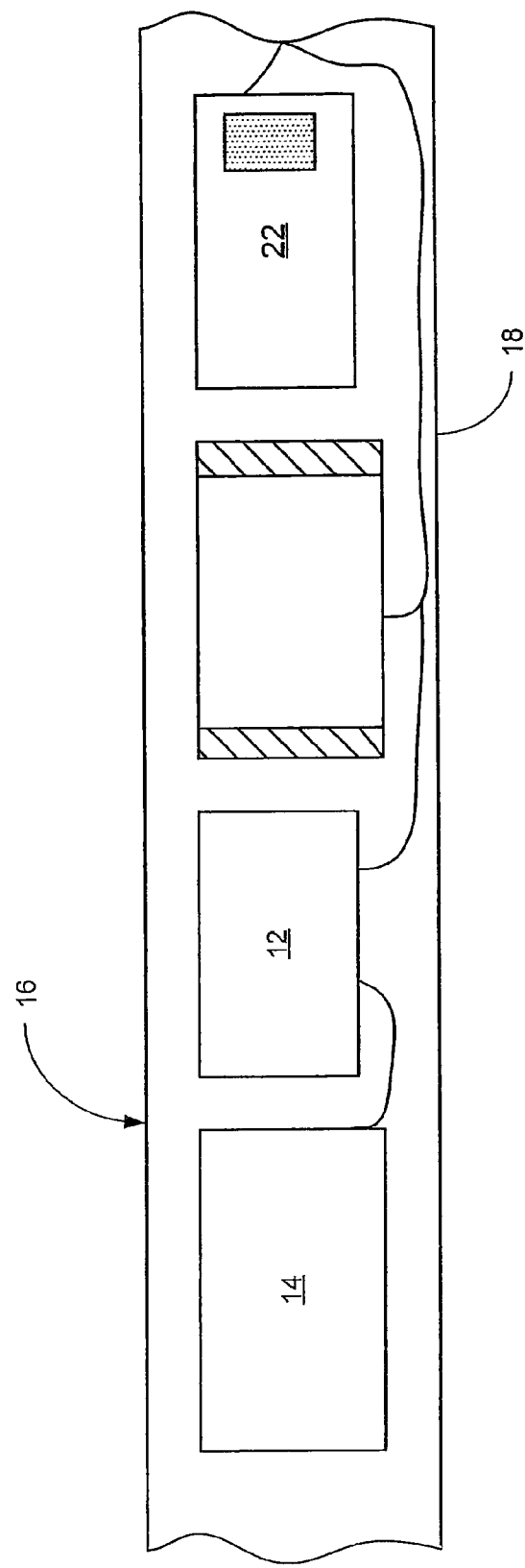
FIG. 24 is a side view showing the temperature and humidity display portion of a radon monitoring device in accordance with one embodiment of the present invention based on the photograph of FIG. 2.
Figure 25:
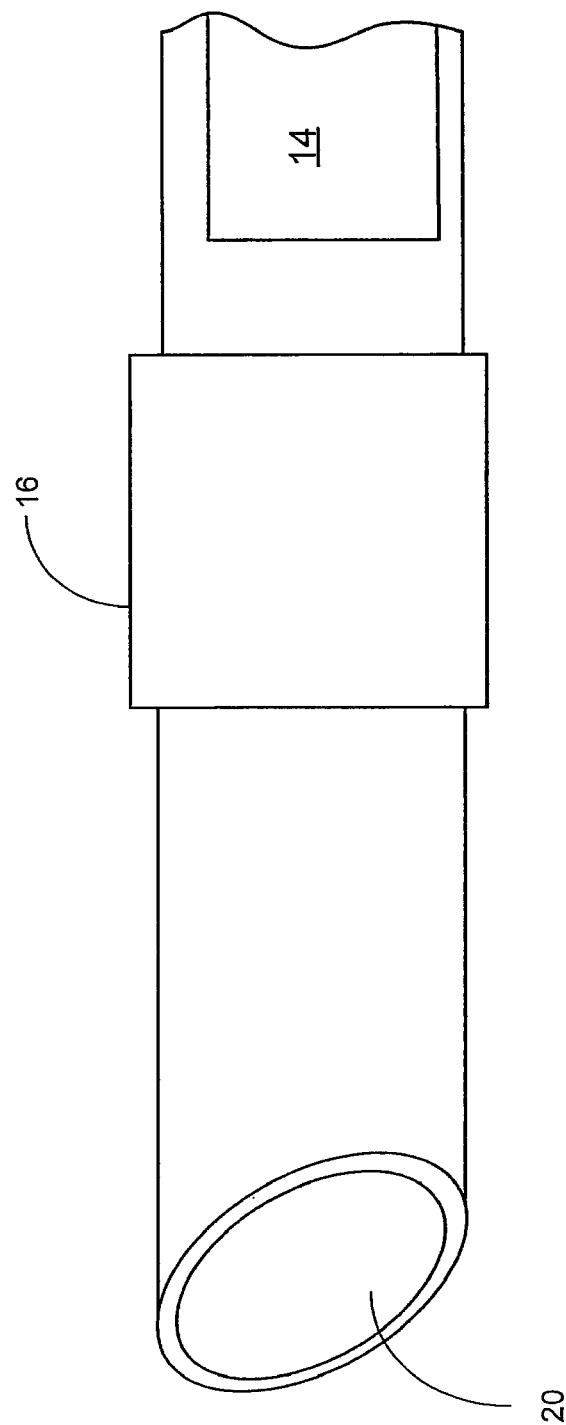
FIG. 25 is a side view showing the lower radon gas entry port having a angled end of a radon monitoring device in accordance with one embodiment of the present invention based on the photograph of FIG. 3.
Figure 26:
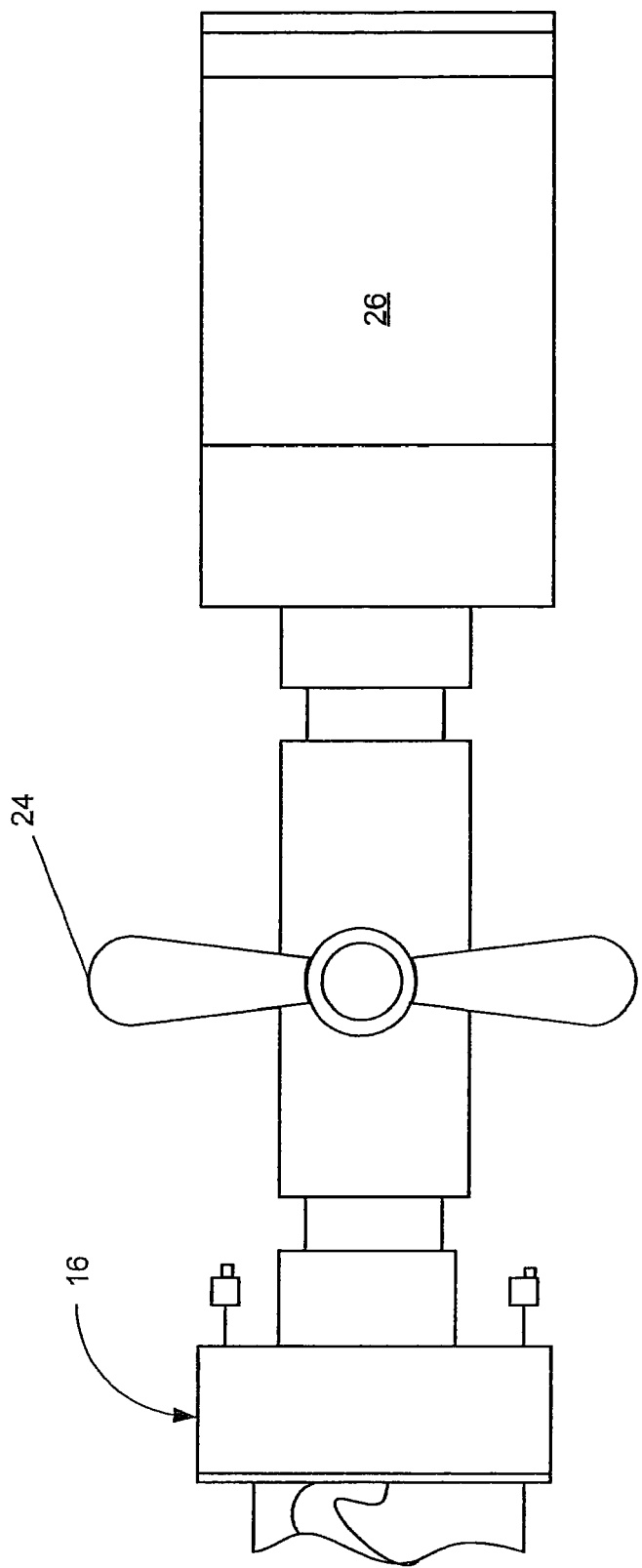
FIG. 26 is a side view of the upper portion of the radon monitoring device of FIG. 1 and in particular the valve and desiccant chamber.

The present invention is related to a system for monitoring radon emissions to predict earthquakes. In one embodiment, the present invention relates to a radon monitoring system that is designed to remotely monitor the release of radon gas and to use such data in the prediction of earthquakes.

Some of the factors that can/may be considered in selecting a site for radon detection for earthquake prediction include the following: (1) the direction and source of stress; (2) single or multiple sources; (3) the nature of the seismic stress, be it compressive, tensile, or sheer; (4) the mechanical properties of the underlying rock formations, such as their density, porosity, modulus of elasticity, and compressive tensile strength; (5) the nature of the fracture and fault zones, particularly, the dip angle of the zones and their amount of gauge; (6) the presence or absence of upwelling water or gases, and (7) the amount and type of such gases; (7) the sources of upwelling gases; and/or (8) the relationship between the fracture and fault zones and the regional tectonics.

As shown in FIGS. 1 to 27, attached hereto, a radon monitoring device 10 according to one embodiment of the present invention is composed of a silicon photodiode detector 12, an interface 14 designed to digitize data, log data, and a transmit/broadcast data via, for example, a wireless link to a satellite. The device also includes a two-layer PVC container 16 to reduce the influence of environmental factors such as temperature, air pressure, wind, pressure and humidity. Insulating material is added in-between the two-layer container. The radon detector is housed in a clear polycarbonate container 18 inside the PVC container 16 with, for example, a 0.6 mil polyethylene plastic window 20 slanted at any suitable angle at the bottom of the container to slow the gas diffusion into the container and to allow the condensed moisture to drip away. In one embodiment, the angle at the bottom of radon monitoring device 10 is in the range of about 25 to about 75 degrees, or from about 35 to about 65 degrees, or even from about 40 to about 60 degrees. In one embodiment, the angle of the bottom of the PVC container is about 45 degrees. It should be noted that the present invention is not limited to the design above. Rather, any suitable combination of container and plastic window can be used so long as the combination thereof permits the entry of radon gas, as detailed below, while protecting the radon monitoring device of the present invention from external environmental factors.

With regard to the selection of the film that forms plastic window 20, a polyethylene film can be used and is chosen to provide a moisture barrier while allowing radon 222 gas to pass through and be detected. Most of the 55 second half-life $^{220}$Rn (radon 220) will undergo decay during transmission/penetration through plastic window 20 and, therefore, will not interfere with the alpha (α) particle detection of the 3.82 day $^{222}$Rn, which is the radon gas of interest in predicting earthquakes.

In addition to these environmental controls, the detector has a heat generating/voltage supply unit 22 designed to supply the necessary voltage to radon monitoring device 10 as well as keep the internal temperature of the polycarbonate container 18 at about 35° C. and relative humidity at less than about 60% at all times. By selecting a transformer to increase a line voltage of 24 volts to 110 volts, the transformer can/will generate heat which is useful in keeping radon monitoring device 10 at a stable temperature and in keeping the moisture/humidity level low. The polycarbonate container 18 also has a valve 24 on top which is connected to a chamber 26 equipped with moisture removing agent (e.g., a desiccant) or device (e.g., a de-humidifier), such as a hygroscopic material to draw moisture out of the chamber.

Once a useful site or sites is/are been selected, a radon monitoring device 10 is installed therein to analyze, preferably in a continuous, real-time manner, the amount and/or frequency of radon gas release. Release of adsorbed radon on the surface of mineral particles is sensitive to stress and can be detected easier than other kind of soil gases such as $CO_2$, $CH_4$, $C_2H_6$, and the like. The monitoring device 10 of the present invention should be located away from human activities to avoid human activity related stresses such as construction, back-filling, mining, withdrawing groundwater, and the like.

In one instance a radon monitoring device in accordance with the present invention is placed in a ditch about 3 meters long, about 0.6 meters wide, and about 1.5 meters deep. The bottom of the ditch is lined with about 40 centimeters of gravel 42 (denoted by "B" in FIG. 27) and covered with approximately a 0.8 mm thick plastic sheet 44 before back filling. A PVC pipe 40 (see FIG. 27) is used to house the radon monitoring device 10 and the pipe 40 is generally anchored in the middle part of a ditch formed in accordance with the above description. The indicator labeled "A" in FIG. 27 denotes the distance from the top of the PVC pipe/housing 40 to the top of the plastic sheet 44 and is approximately 160 centimeters long.

In addition, the placement site should be on a gravelly sandy river terrace deposit high above the groundwater table. The placement site should also have sufficient drainage to ensure rain water runoff does not collect at the placement site. A ditch covered with polyvinyl sheet with the radon monitoring device housing 40 placed in the middle can facilitate the collection of soil gas radon. The housing 40 is capable of protecting the radon monitoring device 10 from a variety of external environmental influences.

A radon receiving zone is constructed in terrain above the groundwater table and any flood zone. This usually about 50 centimeters or about 18 inches under the surface, and preferably in an area of dry soil conditions and constant temperatures. It is lined with gravel or crushed stones 42 to allow soil gas to accumulate (denoted by the arrows in FIG. 27) and a liner on top of this zone to contain the soil gas (see FIG. 27). The lower part of the PVC housing 40 includes perforations 46 to allow soil gas to move into detecting area 48 in the PVC housing 40. The ground surface around the PVC housing 40 is heaped (denoted by reference numeral 50) to dissipate surface precipitation.

A silicon photodiode detector and data logger are employed in soil gas radon measurement. Time variation of radon levels shows that there is a radon earthquake preparation cycle with a fast radon build-up then a sustaining high level, a spike-like anomaly, and then a faster decrease to near background level before the onset of an earthquake. The new integrated approach in soil gas radon monitoring utilizes the spike-like anomalies in radon levels are superior precursors to delineate the time and place of an earthquake. Use of multiple units of this system that are placed at different locations, make it possible for the time, place, and magnitude of earthquakes could all be predicted.

Housing the detecting system inside a PVC pipe and retrieving the data electronically without removing the PVC pipe cap reduced the influence of environmental factors dramatically. The radon detecting system consists of a silicon photodiode detector, an interface, and a data logger. The system/device 10 of the present invention is capable of recording radon flux changes of with less than minute in duration. By connecting the data logger to a modem and telephone line, the data could be retrieved at a remote site at any time, and preferably, in a real time manner.

Realizing that when the ambient temperature is lower than the ground temperature, the upward flow of radon gas is either completely diminished or substantially diminished, it is envisioned that an air pump may be added to the radon monitoring device 10 of the present invention in order to maintain an upward gas flow in such conditions.

Additionally, it has been found that lightning may induce the upward flow of radon and, thus, interfere with an analysis of radon migration based upon seismic activity, and, therefore, it is envisioned that a conducting envelope 52 may be added outside of the housing of the radon monitoring device 10 in order to eliminate or at least significantly reduce the effect of lightning on the migration of radon gases within the selected site and radon detection assembly. An undesirable buildup of pressure may occur within the radon detection assembly 40 (see FIG. 27) when gas is released from the ground, and, the addition of a safety valve (not pictured) is advisable when this occurs. Finally, it should be understood that the electronics and mechanical devices (if any) housed in the assembly will often have to operate at or near 100% humidity for significant periods of time. Thus, the components must be capable of withstanding such humidity as well as any detrimental gases such as $H_2S$, $CH_4$ etc. which may also affect the components of the assembly.

Figure 27:
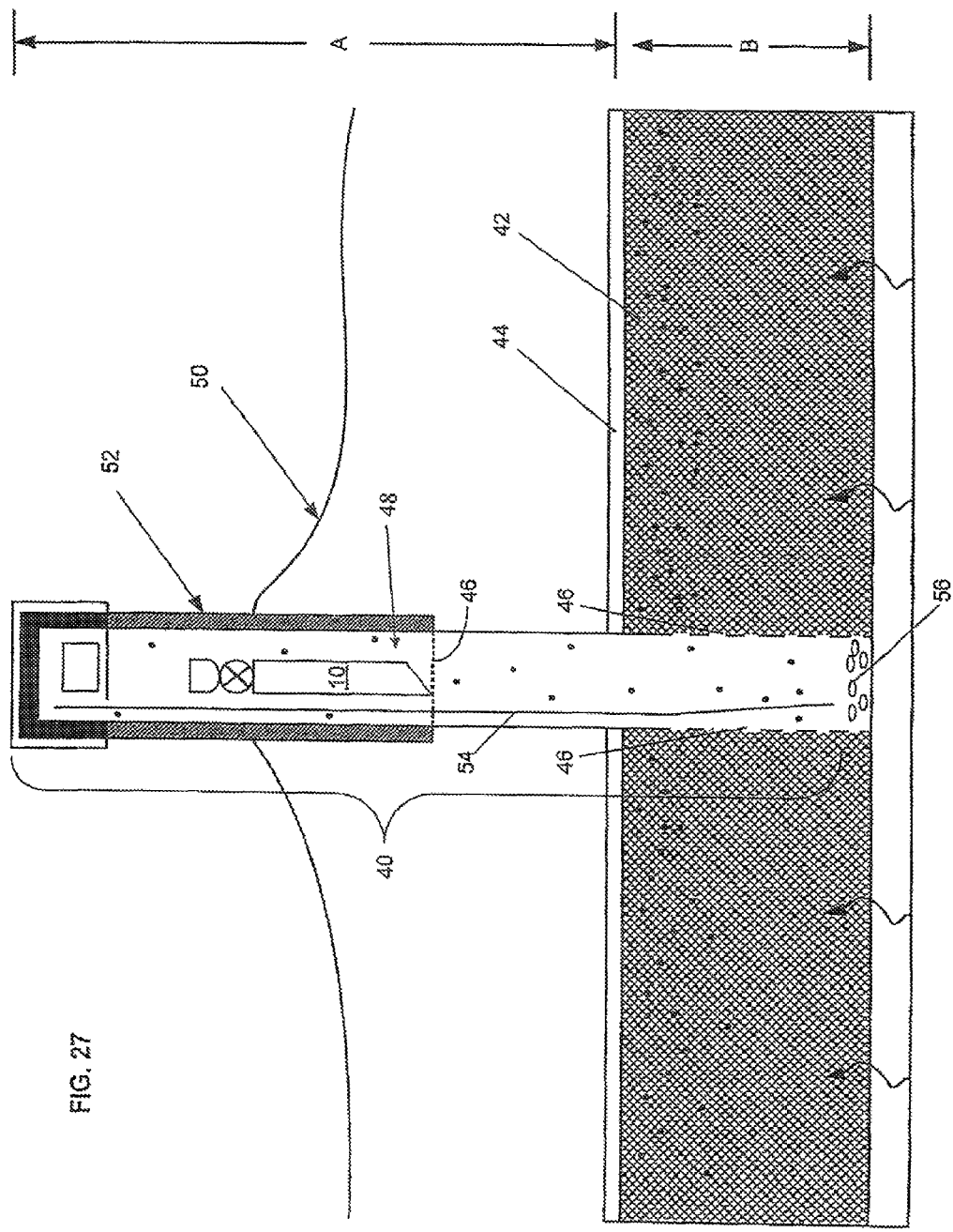
FIG. 27 is a illustration of a radon monitoring device in accordance with one embodiment of the present invention showing a radon monitoring device placed in a monitoring site.

Additionally, bugs, snakes or other "animals" can cause interference if permitted to live inside the lower portion of housing 40. Accordingly, a tube running the length of housing 40 can be included to administer insecticide or some other form of pest control to the bottom of housing 40. This optional feature is illustrated as a tube 54 that runs down the left side of the interior of housing 40 in FIG. 27. Also shown in FIG. 27 is, for example, pesticide particles 56. Radon gas particles are shown as black dots in FIG. 27 (including in housing 40).

A silicon photodiode detector is desirable because it can function under high humidity conditions and is capable of recording the data continuously with very little energy consumption. The recorded data can also be retrieved remotely.

This integrated geological, physical and engineering design is effective in detecting radon signal variations. The continuous radon spectrum contains signals related to earthquake cycle and, therefore, effective in predicting earthquakes. Multiple units functioning at strategic sites could provide new hope in even shorter earthquake prediction and may lead to understanding the duration of precursory time.

The digitized radon flux signals recorded in real time can be beamed from a receiving station to satellite for long distance broadcasting. Recognizing terrain complexity, low frequency radio waves are generally used for such a purpose, but the invention is not limited thereto. Utilizing satellite broadcasting, a global prediction system could also be established, if desired. The radon monitoring device of the present invention is advantageous in that such device require minimal energy and could even be powered by solar cells, if so desired.

As far as placement of a device in accordance with the present invention, a fault zone should be at least 10 m wide and known to be active during the last 1000 years as determined by $^{14}C$ dating or other methods. InSAR (interferometric synthetic aperture radar) images are used to define areas without fringes for the siting of radon monitoring system. In area with fringes, stress is distributed over a large area. In area without InSAR fringes, stress is absorbed only by strain in fault zone. The corresponding strain in fault zone releases the adsorbed radon on mineral particle surface.

According to one embodiment of the present invention, if radon gas is released at a rate that is at least twice as high as the immediate background rate in a recording time series, the spike anomaly is defined as an earthquake precursor. Such a spike-like anomaly could be used to flag the transmitter that a significant earthquake is to occur within a few days and/or within a certain geographical area, depending on magnitude.

Example Data

Figure 28:
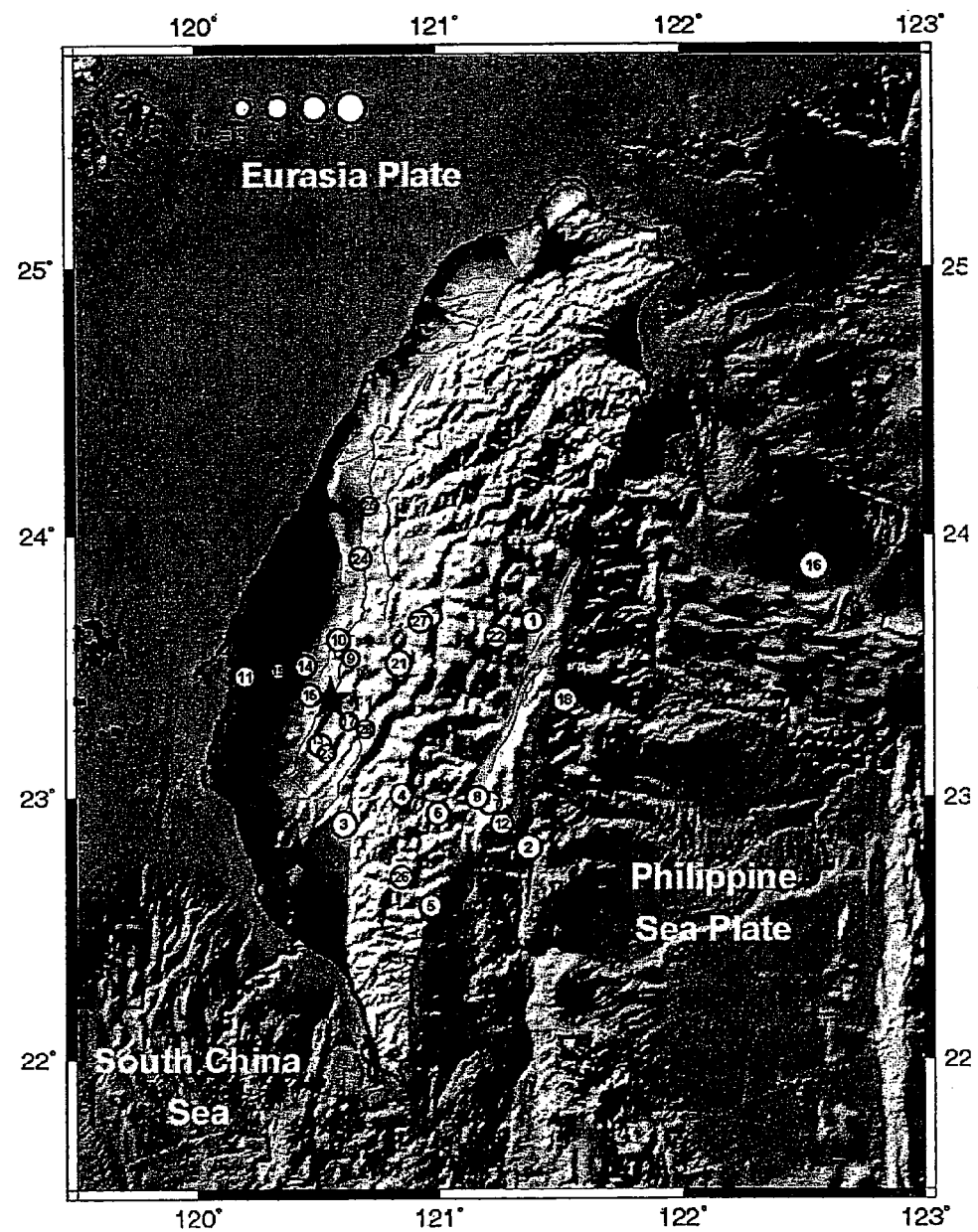
FIG. 28 is a map showing data collection points and recorded earthquakes.

Taiwan is located at the junction of the Ryukyu and the Philippine arc. The intense interaction of the Eurasia and Philippine Sea plate made a small portion of the latter obducted on the former in eastern Taiwan. Taiwan has two tectonic movements; one is the obduction of the Philippine Sea plate northwestward against the Eurasia Plate and the other one is the movement of the Philippine Sea Plate northward toward the Okinawa trench. Most of the earthquakes in Taiwan are related to these two movements as well as the distribution of major faults. FIG. 28 illustrates the fault lines located in and around Taiwan and the location of the monitors Taiwan 1 and 3 formed in accordance with the present invention. The Chisan fault, where Taiwan 3 is located, is considered an active fault recently rather than a suspected one earlier.

As noted above, two of radon monitoring devices 10 formed in accordance with the present invention were placed in Taiwan (T1 and T3) for field test. The recorded time series indicate that precursors do appear before perceivable earthquakes ($M_L$>3.5, that is earthquakes on the Richter scale of at least 3.5). As can be concluded from the data shown below in Table 1, the spike-like anomaly of radon in the time series is a result of stress. It is likely that this is related to the release of adsorbed radon on the surface of mineral or soil particles as the stress is mounting.

Table 1 lists the latest tabulation of precursors observed at T1 and T3 with pertinent information related to earthquakes also listed. The precursors of earthquakes IX, XI, XV, and XXV were observed at both stations. By analyzing the timing of the precursors, the focus of the timing of the corresponding earthquake can be estimated along a linear trend.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

TABLE 1

| Data Point Number | Precursor T1 Hour/Day/Month/Year | Precursor T3 Hour/Day/month/Year | Earthquake Hour/Day/Month/Year | Interval (day)* | Distance (km)* | Depth (km) | Magnitude |
|---|---|---|---|---|---|---|---|
| I | 00/4/10/04 | | 07/4/10/04 | 0.29, none | 91, 140 | 37.8 | 4.6 |
| II | 22/4/17/04 | | 02/4/20/04 | 2.16, none | 104, 98 | 43.4 | 5.1 |
| III | | 12/4/21/04 | 22/4/23/04 | none, 2.14 | 53, 24 | 21.2 | 5 |
| IV | | 22/5/18/04 | 05/5/22/04 | none, 3.30 | 51, 51 | 7.4 | 4.3 |
| V | | 10/5/22/04 | 17/5/24/04 | none, 2.30 | 97, 61 | 2 | 4.6 |
| VI | 3/6/8/04 | | 24/6/10/04 | 2.87, none | 66, 62 | 3.8 | 4.8 |
| VII | 4/6/11/04 | | 10/6/13/04 | 2.25, none | 80, 84 | 25.1 | 4.6 |
| VIII | 00/6/15/04 | | 11/6/19/04 | 4.46, none | 75, 80 | 2.5 | 4.5 |
| IX | 8/8/4/04 | 4/8/4/04 | 22/8/5/04 | 1.58, 1.75 | 25, 92 | 10.4 | 4 |
| X | 03/8/20/04 | | 09/8/22/04 | 2.79, none | 37, 78 | 13.3 | 4.5 |
| XI | 7/8/25/04 | 00/8/25/04 | 17/8/26/04 | 1.42, 1.71 | 89, 87 | 18.9 | 4.2 |
| XII | | 00/8/31/04 | 14/9/2/04 | none, 2.58 | 20, 47 | 6.4 | 4.5 |
| XIII | 21/9/27/04 | | 07/9/29/04 | 1.92, none | 18, 79 | 16 | 4 |
| XIV | 05/11/1/04 | | 22/11/3/04 | 2.71, none | 9, 67 | 5.9 | 4 |
| XV | 06/11/4/04 | 16/11/5/04 | 24/11/8/04 | 4.75, 3.33 | 211, 249 | 10 | 6.7 |
| XVI | 01/12/10/04 | | 08/12/15/04 | 4.96, none | 12, 60 | 13.8 | 3.7 |
| XVII | 03/12/16/04 | | 08/12/22/04 | 6.21, none | 99, 130 | 20.5 | 5 |
| XVIII | 21/1/1/05 | | 15/1/7/05 | 5.75, none | 25, 77 | 15.4 | 3.4 |
| XX | 07/1/17/05 | | 16/1/20/05 | 3.38, none | 33, 91 | 13 | 5.4 |
| XXI | 08/1/31/05 | | 21/2/4/05 | 4.54, none | 75, 124 | 54.3 | 4.3 |
| XXII | 7/2/4/05 | | 00/2/8/05 | 3.72, none | 23, 45 | 10.9 | 3.6 |
| XXIII | 17/2/21/05 | | 15/3/4/05 | 10.9, none | 61, 128 | 15.2 | 4.1 |
| XXIV | 8/3/5/05 | | 6/3/10/05 | 4.92, none | 84, 150 | 31.4 | 3.8 |
| XXV | 18/3/14/05 | 11/3/10/05 | 24/3/15/05 | 1.25, 5.54 | 81, 46 | 17.9 | 4.1 |
| XXVI | 9/3/16/05 | | 3/3/20/05 | 3.75, none | 51, 111 | 6.2 | 4.5 |
| XXVII | 22/3/18/05 | | 23/3/21/05 | 3.04, none | 20, 60 | 11.7 | 3.7 |

What is claimed is:

1. A device for detecting radon gas comprising:
   a water-proof container having a radon detecting chamber;
   a radon detecting means in the radon detecting chamber;
   a power means operatively coupled to the radon detecting means; and
   an entry window designed to permit the inflow of radon gas while restricting the flow of moisture and other detrimental environmental factors into said radon detecting chamber,
   wherein the entry window is angled with respect to the direction of gravity to allow condensed moisture to drip away from the entry window; wherein the entry window comprises a plastic film that is permeable to radon gas while being impermeable to water and water vapor; wherein the plastic film is polyethylene of 0.6 mils thickness such that radon 220 inflow into said radon detecting chamber is inhibited due to its half life.

2. The device of claim 1, wherein the container further comprises a desiccating chamber drawing moisture out of the radon detecting chamber.

3. The device of claim 1, wherein the entry window is angled at from 25 to 75 degrees off of horizontal.

4. A method for detecting radon gas in order to predict earthquakes, the method comprising the steps of:
- (A) placing a radon monitoring device in the ground at a suitable monitoring location that is above the ground-water table and the flood zone of that monitoring location, the radon monitoring device comprising:
  - a water-proof container having a radon detecting chamber;
  - a radon detecting means in the radon detecting chamber;
  - a power means operatively coupled to the radon detecting means; and
  - an entry window designed to permit the inflow of radon gas while restricting the flow of moisture and other detrimental environmental factors into said radon detecting chamber,
  - wherein the entry window is angled with respect to the direction of gravity to allow condensed moisture to drip away from the entry window; wherein the entry window comprises a plastic film that is permeable to radon gas while being impermeable to water and water vapor; wherein the plastic film is polyethylene of 0.6 mils thickness such that radon 220 inflow into said radon detecting chamber is inhibited due to its half life;
- (B) using the radon monitoring device to detect changes, over time, in the amount of radon gas escaping from the ground;
- (C) using the detected changes in the amount of radon gas released, over time, from the ground to generate radon gas release data;
- (D) collecting the radon gas release data from Step (C) for analysis in order to predict the occurrence of at least one earthquake.

5. The method of claim 4, wherein the earthquake has a strength of at least 3.0 on the Richter scale.

6. The method of claim 4, wherein the earthquake has a strength of at least 4.0 on the Richter scale.

7. The method of claim 4, wherein the earthquake has a strength of at least +5.0 on the Richter scale.

8. The method of claim 4, wherein the earthquake has a strength of at least 6.0 on the Richter scale.

9. The method of claim 4, wherein the container of the device of Step (A) further comprises a desiccating chamber drawing moisture out of the radon detecting chamber.

10. The method of claim 4, wherein the entry window is angled at from 25 to 75 degrees off of horizontal.

* * * * *